(12) United States Patent
Kwon (10) Patent No.: US 12,092,178 B2
(45) Date of Patent: Sep. 17, 2024

(54) BRAKE APPARATUS FOR VEHICLE

(71) Applicant: HYUNDAI MOBIS CO., LTD., Seoul (KR)

(72) Inventor: Taik Sang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 379 days.

(21) Appl. No.: 17/750,964

(22) Filed: May 23, 2022

(65) Prior Publication Data
US 2023/0003272 A1 Jan. 5, 2023

(30) Foreign Application Priority Data

Jun. 30, 2021 (KR) ........................ 10-2021-0085518

(51) Int. Cl.
| | |
|---|---|
| *F16D 65/46* | (2006.01) |
| *B61H 5/00* | (2006.01) |
| *F16D 55/226* | (2006.01) |
| *F16D 65/00* | (2006.01) |
| *F16D 65/18* | (2006.01) |
| *F16D 65/50* | (2006.01) |

(52) U.S. Cl.
CPC ............ *F16D 65/50* (2013.01); *B61H 5/00* (2013.01); *F16D 55/226* (2013.01); *F16D 65/0068* (2013.01); *F16D 65/18* (2013.01)

(58) Field of Classification Search
CPC .. F16D 65/46; F16D 65/50; F16D 65/650068; F16D 65/18; F16D 55/226; F16D 2125/40; B61H 5/00
See application file for complete search history.

(56) References Cited

U.S. PATENT DOCUMENTS

| | | | | |
|---|---|---|---|---|
| 3,724,605 A | * | 4/1973 | Naismith | ................ F16D 65/54 188/196 P |
| 6,988,596 B2 | * | 1/2006 | Gerard | .................... F16D 65/18 188/196 D |
| 9,434,361 B2 | * | 9/2016 | Hauber | .................... B60T 8/172 |
| 10,184,536 B2 | * | 1/2019 | Chelaidite | ............ F16D 65/183 |
| 10,436,269 B2 | * | 10/2019 | Demorais | ............. F16D 55/226 |
| 11,511,715 B2 | * | 11/2022 | Gerber | ................. B60T 17/083 |
| 2002/0185340 A1 | * | 12/2002 | Kojima | ................... F16D 65/18 188/72.8 |

(Continued)

FOREIGN PATENT DOCUMENTS

KR    10-2010-0098846 A    9/2010

*Primary Examiner* — Thomas W Irvin
(74) *Attorney, Agent, or Firm* — NovoTechIP International PLLC (57) ABSTRACT

A brake apparatus for a vehicle may include: a caliper part fixed to a vehicle body, and having a cylinder provided therein; a piston part movably installed in the cylinder, and brought into contact with or separated from a pad plate part according to a moving direction thereof; a shaft part configured to receive a driving force from a driving part, and reciprocate in a direction parallel to a longitudinal direction of the cylinder; a pressing part connected to the shaft part, and configured to press the piston part toward the pad plate part as the shaft part is moved to one side; and an angle adjusting part provided between the shaft part and the pressing part, and configured to vary an installation angle of the shaft part with respect to the pressing part.

15 Claims, 8 Drawing Sheets

(56) References Cited

U.S. PATENT DOCUMENTS

| | | | |
|---|---|---|---|
| 2015/0217737 A1* | 8/2015 | Hauber | F16D 65/18 188/72.3 |
| 2016/0230825 A1* | 8/2016 | Garcia Blanco | F16D 65/18 |
| 2021/0215215 A1* | 7/2021 | Kim | F16D 55/226 |
| 2021/0231183 A1* | 7/2021 | Shin | F16D 55/226 |
| 2021/0300310 A1* | 9/2021 | Gerber | F16D 55/226 |
| 2021/0301889 A1* | 9/2021 | Gerber | B60T 13/746 |
| 2021/0387603 A1* | 12/2021 | Hur | F16D 65/183 |
| 2022/0065314 A1* | 3/2022 | Kim | F16D 65/0979 |
| 2022/0212648 A1* | 7/2022 | Kim | F16D 65/183 |
| 2022/0235838 A1* | 7/2022 | Choi | F16D 65/183 |
| 2023/0128238 A1* | 4/2023 | Bertrand | F16D 65/18 188/71.1 |

\* cited by examiner

BRAKE APPARATUS FOR VEHICLE

CROSS-REFERENCE TO RELATED APPLICATIONS

This application claims priority from and the benefit of Korean Patent Application No. 10-2021-0085518, filed on Jun. 30, 2021, which is hereby incorporated by reference for all purposes as if set forth herein.

BACKGROUND

1. Technical Field

Exemplary embodiments of the present disclosure relate to a brake apparatus for a vehicle, and more particularly, to a caliper-type brake apparatus for a vehicle.

2. Discussion of Related Art

In general, a brake apparatus for a vehicle refers to an apparatus for keeping the vehicle stationary. The brake apparatus serves to keep the wheels of the vehicle from rotating. Recently, an EPB (Electronic Parking Brake) system for electronically controlling the operation of a parking brake is widely used. The EPB system is mounted on a typical disk brake which acquires a braking force by strongly pressing portions of a disk, rotated with a wheel, from both sides thereof through friction pads, and performs the function of the parking brake.

Such a brake apparatus presses a piston by converting a rotational force of a driving motor into a linear motion through a screw and a nut mechanism, and presses a brake pad serving as a friction material against the disk by moving a caliper through the pressing force and the reaction force of the piston, thereby generating a braking force. After the braking is finished, the brake apparatus removes the frictional force by separating the caliper and the piston from the brake pad through a knock back between the brake pad and the disk and a restoring force (roll back) of a piston seal.

In the conventional brake apparatus, however, the caliper has a structural limit that the caliper is deformed when repeatedly operated. Therefore, the axis of the screw may be distorted to apply an excessive load between the screw and the nut mechanism. In this case, the efficiency of power transfer may be degraded, or the gap between the screw and the body may be expanded so that oil inside the caliper leaks.

The related art of the present disclosure is disclosed in Korean Patent Application No. 10-2010-0098846 published on Sep. 10, 2010 and entitled "Disk Brake Having Parking Function."

SUMMARY

Various embodiments are directed to a brake apparatus for a vehicle, which can prevent an oil leakage and degradation in efficiency of power transfer when a caliper is deformed.

In an embodiment, a brake apparatus for a vehicle may include: a caliper part fixed to a vehicle body, and having a cylinder provided therein; a piston part movably installed in the cylinder, and brought into contact with or separated from a pad plate part according to a moving direction thereof; a shaft part configured to receive a driving force from a driving part, and reciprocate in a direction parallel to a longitudinal direction of the cylinder; a pressing part connected to the shaft part, and configured to press the piston part toward the pad plate part as the shaft part is moved to one side; and an angle adjusting part provided between the shaft part and the pressing part, and configured to vary an installation angle of the shaft part with respect to the pressing part.

The cylinder may be rotated in a first direction by a reaction force generated by the contact between the piston part and the pad plate part, and the shaft part may be rotated on the angle adjusting part in the first direction with the cylinder.

The pressing part may be fixed to an inner surface of the piston part.

The pressing part may have a front surface coming into surface contact with an inner rear surface of the piston part.

The front surface of the pressing part may be formed in a plane shape.

The angle adjusting part may include: an insertion part extended from the pressing part, and having an empty space formed therein; and a ball joint part extended from the shaft part, and rotated inside the insertion part in connection with a change in angle of the shaft part.

The angle adjusting part may further include a load switching part concavely recessed into the pressing part from the insertion part, and configured to come into rolling contact with a front surface of the ball joint part.

The load switching part may include a first inclined surface and a second inclined surface which are disposed so that a distance therebetween decreases toward the pressing part from the insertion part.

An angle that the first inclined surface forms with a center axis of the cylinder may be smaller than an angle that the second inclined surface forms with the center axis of the cylinder.

The angle adjusting part may further include a separation prevention part extended from the insertion part, and disposed so as to face a rear surface of the ball joint part.

The separation prevention part may be provided as a plurality of separation prevention parts which are arranged at predetermined intervals in a circumferential direction of the insertion part.

The brake apparatus may further include a stopper part extended from the shaft part, and configured to constrain an axial rotation of the shaft part by interfering with the insertion part.

The stopper part may be protruded in a radial direction of the shaft part from an outer circumferential surface of the shaft part and inserted into a cut-out portion formed in the insertion part.

The stopper part may have both surfaces abutting on an inner surface of the cut-out portion, and configured to constrain the axial rotation of the shaft part.

The stopper part may be moved in a longitudinal direction of the cut-out portion as the shaft part is rotated in the first direction.

In accordance with the embodiment of the present disclosure, the brake apparatus for a vehicle may prevent a gap in the connection portion between the cylinder and the spindle, which may occur when the cylinder is deformed by a reaction force of the piston part, because the installation angle of the shaft part with respect to the pressing part can be varied by the angle adjusting part.

Furthermore, although the stroke length of the piston part is changed due to the wear of the pad plate part, the angle adjusting part may change the position of the rotation center axis of the shaft part while moved with the shaft part, thereby preventing a jam between the shaft part and the pressing part while preventing the degradation in power transfer performance to the piston part.

Furthermore, although the angle of the shaft part is changed by the load switching part, the brake apparatus may induce a pressing load, applied through the ball joint part, to be transferred in a direction parallel to the direction that the piston part is moved forward and backward.

Furthermore, as the pressing part having the front surface formed in a plane shape comes in surface contact with the entire inner rear surface of the piston part, the pressing part may come into constant pressure contact with the piston part without eccentric pressure, and make the most of the braking area, thereby improving the braking efficiency.

Furthermore, the pressing part of the brake apparatus may be fixed to the inner surface of the piston part. Thus, when the shaft part is moved backward to remove the braking force, the pressing part may separate the piston part from the pad plate part through a fixing force with the piston part, thereby completely removing a residual braking force while preventing a drag.

DETAILED DESCRIPTION

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Throughout the specification, when one element is referred to as being "connected to" or "coupled to" another element, it may indicate that the one element is "directly connected or coupled to" the other element or the one element is "indirectly connected or coupled to" with still another element interposed therebetween. In this specification, when an element "includes or has" a component, it may indicate that the element does not exclude another component unless referred to the contrary, but can further include or have another component.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of subcomponents included in the drawings of this specification and the relative difference between sizes are set for convenience of description, and may not limit embodiments but may be set to various values.

Figure 1:
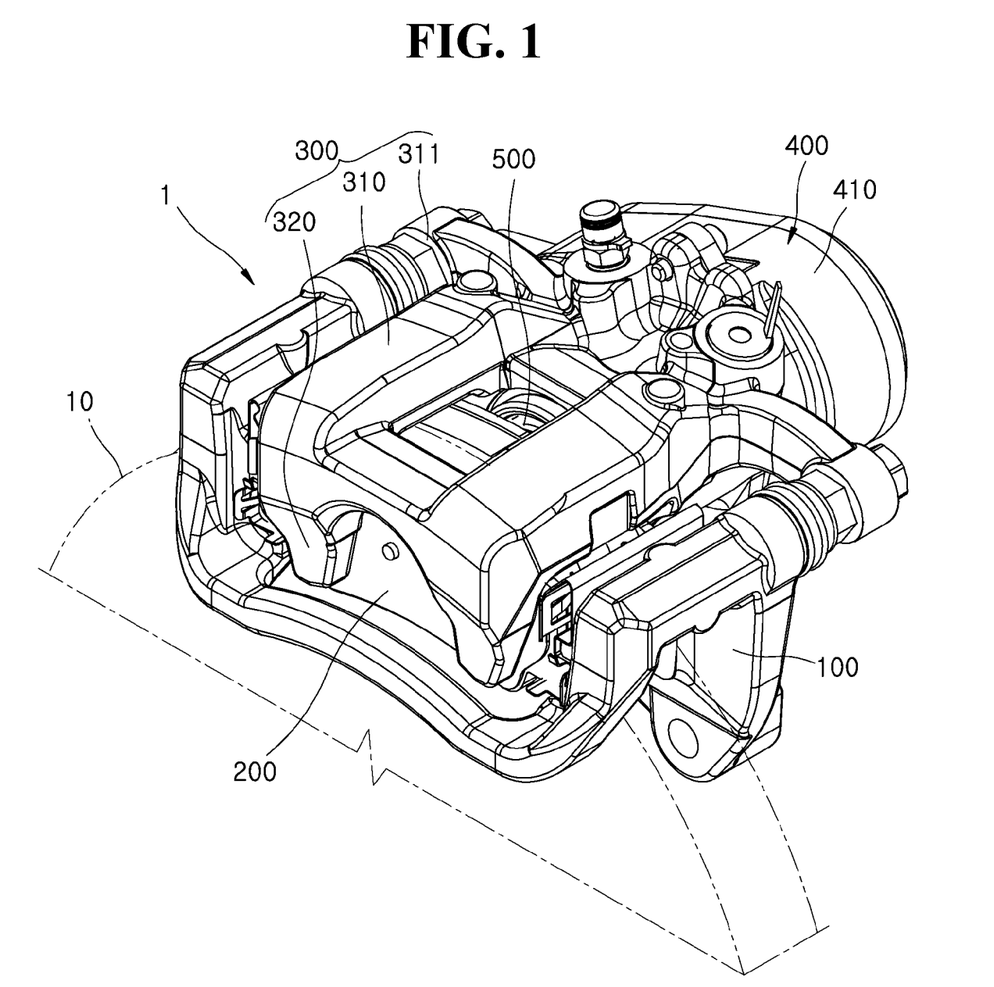
FIG. 1 is a perspective view schematically illustrating that a brake apparatus for a vehicle in accordance with an embodiment of the present disclosure is installed.
Figure 2:
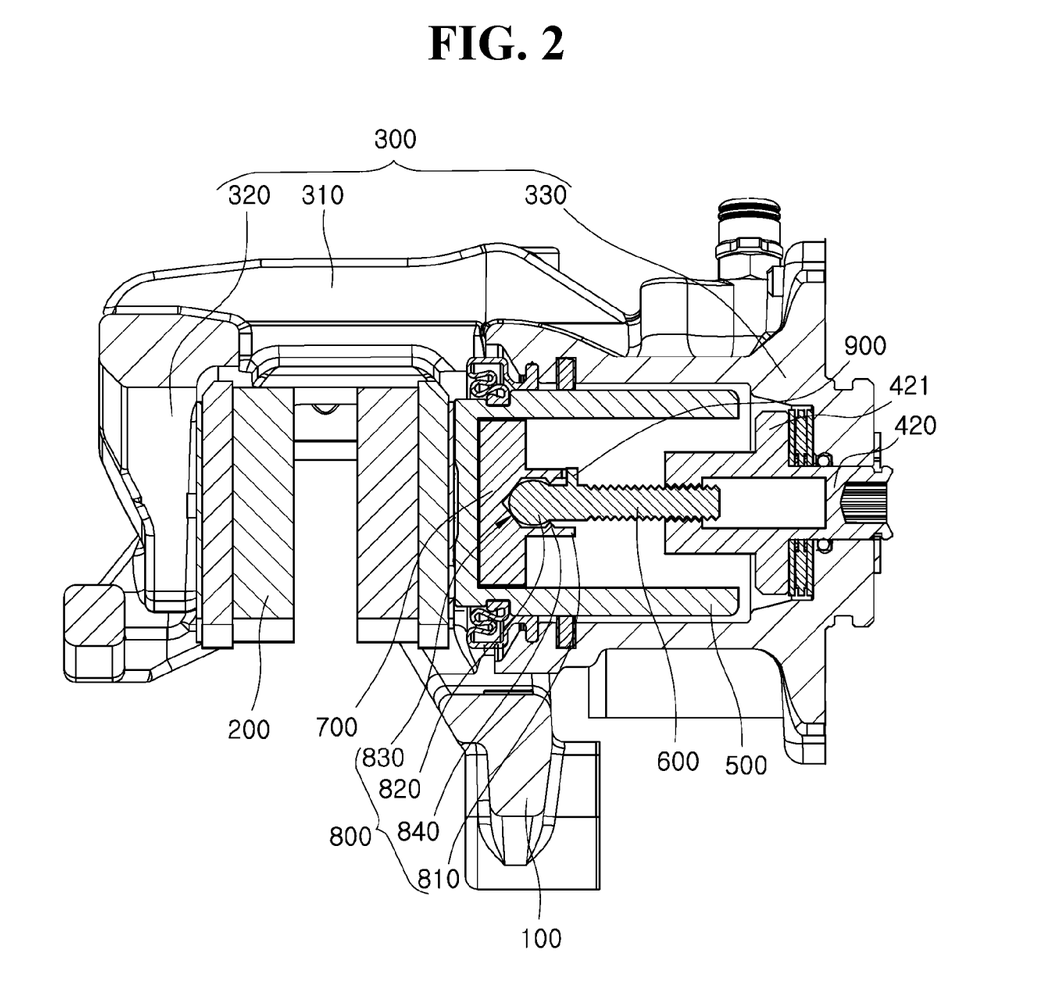
FIG. 2 is a cross-sectional view schematically illustrating the configuration of the brake apparatus for a vehicle in accordance with the embodiment of the present disclosure.

FIG. 1 is a perspective view schematically illustrating that a brake apparatus for a vehicle in accordance with an embodiment of the present disclosure is installed, and FIG. 2 is a cross-sectional view schematically illustrating the configuration of the brake apparatus for a vehicle in accordance with the embodiment of the present disclosure.

Referring to FIGS. 1 and 2, a brake apparatus 1 for a vehicle in accordance with an embodiment of the present disclosure includes a carrier part 100, a caliper part 300, a pad plate part 200, a driving part 400, a piston part 500, a shaft part 600, a pressing part 700, an angle adjusting part 800, and a stopper part 900.

The carrier part 100 is coupled or fixed to a vehicle body, and serves to support the caliper part 300 which will be described below. The carrier part 100 in accordance with the embodiment of the present disclosure may be coupled or fixed to a knuckle (not illustrated) connected to the vehicle body through a bolt or the like. The carrier part 100 may include a high rigidity material such as steel so as to sufficiently endure a load transferred from the caliper part 300. The shape of the carrier part 100 is not limited to that illustrated in FIGS. 1 and 2, and may be variously changed in design as long as the carrier part 100 can be coupled or fixed to the vehicle body.

The pad plate part 200 is disposed so as to face a disk 10 which is rotated with a wheel. The pad plate part 200 is installed so as to move forward to or backward from the disk 10. The pad plate part 200 applies a braking force to the vehicle or removes the braking force while pressed against the disk 10 by a pressing force transferred from the piston part 500 to be described below or separated from the disk 10. The pad plate part 200 in accordance with the embodiment of the present disclosure is provided as a pair of pad plate parts. The pad plate parts 200 are disposed with the disk 10 interposed therebetween, while facing both side surfaces of the disk 10. The pair of pad plate parts 200 may be movably supported by the caliper part 300 or the carrier part 100 which will be described below. A friction pad made of a material with a high frictional coefficient, such as rubber, may be attached to one surface of the pad plate part 200, facing the disk 10.

The caliper part 300 serves to form the approximate exterior of the brake apparatus 1 for a vehicle in accordance with the embodiment of the present disclosure, and support the driving part 400, the piston part 500, the shaft part 600, the pressing part 700, the angle adjusting part 800, and the stopper part 900, which will be described. The caliper part 300 is coupled or fixed to the vehicle body through the carrier part 100.

The caliper part 300 in accordance with the embodiment of the present disclosure includes a bridge 310, a finger 320, and a cylinder 330.

The bridge 310 serves to form the upper exterior of the caliper part 300, and support the finger 320 and the cylinder 330 which will be described below. The bridge 310 is extended in a longitudinal direction thereof, which is parallel to the axial direction of the disk 10. The bridge 310 has both ends disposed on both sides of the disk 10, respectively.

The bridge 310 may be slidably connected to the carrier part 100 through pin-shaped guide rods 311 disposed on both sides thereof. The bridge 310 is slid in the longitudinal direction thereof by a reaction force generated between the pad plate part 200 and the piston part 500. The bridge 310 may support the pair of pad plate parts 200 so as to move forward or backward in a direction parallel to the axial direction of the disk 10. The specific shape of the bridge 310 is not limited to that illustrated in FIGS. 1 and 2, but may be variously changed in design as long as the bridge 310 can support the finger 320 and the cylinder 330.

The finger 320 may be extended from one side of the bridge 310, while facing any one of the pair of pad plate parts 200. The finger 320 may be formed as one body with the bridge 310 through welding, pressing, bending or the like, and detachably coupled to the bridge 310 through bolting or the like. The finger 320 in accordance with the embodiment of the present disclosure is vertically extended downward from the front end of the bridge 310. The finger 320 has an inner surface facing the pad plate part 200 disposed on the outside (left side in FIG. 2) on the basis of the disk 10, between the pair of pad plate parts 200. The finger 320 presses or releases the pad plate part 200 disposed on the outside on the basis of the disk 10 in connection with the sliding movement of the bridge 310.

The cylinder 330 may be extended from the other side of the bridge 310, while facing the other of the pair of pad plate parts 200. The cylinder 330 is formed in a hollow shape, and thus has an internal space in which the piston part 500 can be installed. The cylinder 330 may have an oil port into which brake oil is introduced, such that hydraulic pressure for braking can be applied to the inside thereof. The cylinder 330 in accordance with the embodiment of the present disclosure is extended downward from the rear end of the bridge 310. The cylinder 330 is formed in a hollow cylindrical shape whose one side is open, and the open side faces the pad plate part 200 disposed on the inside (right side in FIG. 2) on the basis of the disk 10, between the pair of pad plate parts 200.

The driving part 400 is supported by the caliper part 300, and serves to generate a driving force. The driving part 400 is connected to the shaft part 600 which will be described, and transfers the driving force to the shaft part 600.

The driving part 400 in accordance with the embodiment of the present disclosure includes a power generator 410 and a spindle 420.

The power generator 410 may be installed at the rear of the cylinder 330, and exemplified as various types of electric motors which receive power from a battery of the vehicle or the like and generate a rotational force.

The spindle 420 is connected to an output shaft of the power generator 410, and rotated with the output shaft of the power generator 410. The spindle 420 in accordance with the embodiment of the present disclosure has one side (right side in FIG. 2) which vertically protrudes from the rear surface of the cylinder 330 through the cylinder 330. The one side of the spindle 420 may be spline-coupled to the output shaft of the power generator 410. Between the spindle 420 and the cylinder 330, a sealing member such as an O-ring may be installed so as to prevent the leakage of oil stored in the cylinder 330.

The other side (left side in FIG. 2) of the spindle 420 is disposed in the cylinder 330, and extended in a direction parallel to the longitudinal direction of the cylinder 330. The other side of the spindle 420 may be formed in substantially a hollow cylindrical shape. The other side of the spindle 420 has a screw thread formed on the inner circumferential surface thereof, and thus is screwed to the outer circumferential surface of the shaft part 600 which will be described below.

The spindle 420 has a flange 421 formed in the central portion thereof and extended in the radial direction of the spindle 420. The flange 421 in accordance with the embodiment of the present disclosure may be formed in substantially a disk shape. The rear surface of the flange 421 may be brought into contact with a thrust bearing, and rotatably supported by an inner rear surface of the cylinder 330.

The piston part 500 is movably installed in the cylinder 330, while facing the other of the pair of pad plate parts 200. The piston part 500 presses or releases the pad plate part 20 against or from the disk 10 while brought into contact with or separated from the pad plate part 200 according to the moving direction thereof.

The piston part 500 in accordance with the embodiment of the present disclosure is formed in a cup shape whose one side is open. The cross-sectional shape of the piston part 500 may be variously changed in design to circular, polygonal, and elliptical shapes. The piston part 500 is disposed so that the closed side thereof faces the pad plate part 200 and the open side thereof faces the rear. The inner rear surface of the piston part 500 may be flat or formed in a plane shape so as to secure a wide contact area with the pressing part 700 which will be described.

The outer surface of the piston part 500 may be spaced apart by a predetermined distance from the inner surface of the cylinder 330, thereby forming a gap therebetween. In this case, the piston part 500 is elastically supported inside the cylinder 330 by a corrugate tube installed at the front of the cylinder 330 or an O-ring installed in the cylinder 330. Thus, the piston part 500 may prevent the degradation in moving performance thereof by the friction with the inner surface of the cylinder 330.

As the caliper part 300 is formed in substantially a U-shape, the piston part 500 deforms the cylinder 330 through a reaction force which is generated when the piston part 500 comes into contact with the pad plate part 200. More specifically, the piston part 500 rotates the cylinder 330 in a first direction A by using the reaction force which is generated in the opposite direction of the pressing force to press the pad plate part 200. The first direction A may indicate the direction in which the cylinder 330 spreads to the outside of the pad plate part 200, and may be exemplified as the counterclockwise direction in FIG. 2.

The shaft part 600 is connected to the driving part 400, and disposed in the cylinder 330. The shaft part 600 serves to receive a driving force from the driving part 400, and reciprocate in two opposite direction parallel to the longitudinal direction of the cylinder 330.

The shaft part 600 in accordance with the embodiment of the present disclosure may be formed in a rod shape with a screw thread formed on the outer circumferential surface thereof. The axial direction of the shaft part 600 is set in parallel to the longitudinal direction of the cylinder 330. The outer circumferential surface of the shaft part 600 is screwed to the inner circumferential surface of the spindle 420. Thus, when the spindle 420 is rotated, the shaft part 600 linearly reciprocates inside the cylinder 330 while converting the rotational motion of the spindle 420 into a linear motion.

The pressing part 700 is connected to the shaft part 600 through the angle adjusting part 800 to be described below. The pressing part 700 is moved with the shaft part 600 when the shaft part 600 reciprocates. As the shaft part 600 is moved to one side, the pressing part 700 presses the piston part 500 toward the pad plate part 200. That is, the pressing part 700 functions as a component that finally transfers the driving force, generated by the driving part 400, to the piston part 500.

The pressing part 700 in accordance with the embodiment of the present disclosure has a rear surface (right surface in FIG. 2) facing a front end (left end in FIG. 2) of the shaft part 600. The pressing part 700 has a front surface facing the inner rear surface of the piston part 500. The pressing part 700 has a cross-sectional shape corresponding to the cross-sectional shape of the piston part 500.

The front surface of the pressing part 700 comes into surface contact with the inner rear surface of the piston part 500. More specifically, the front surface of the pressing part 700 is flat or formed in a plane shape, and comes into surface contact with the entire inner rear surface of the piston part 500. Therefore, the pressing part 700 may come into constant pressure contact with the piston part 500 without eccentric pressure, and make the most of the braking area, thereby improving the braking efficiency.

The pressing part 700 may be coupled or fixed to the inner surface of the piston part 500. That is, the front surface and the circumferential surface of the pressing part 700 may be press-fitted onto the inner rear surface and the inner circumferential surface of the piston part 500, respectively, or fixed by a separate adhesive member. Thus, when the shaft part 600 is moved backward to remove the braking force, the pressing part 700 may separate the piston part 500 from the pad plate part 200 through a fixing force with the piston part 500, thereby completely removing a residual braking force while preventing a drag.

The angle adjusting part 800 is provided between the shaft part 600 and the pressing part 700, and serves to connect the shaft part 600 and the pressing part 700 to each other. When the cylinder 330 is deformed by the piston part 500, the angle adjusting part 700 serves to induce the variation in installation angle of the shaft part 600 with respect to the pressing part 700. More specifically, when the cylinder 330 is rotated in the first direction A by a reaction force generated by the contact with the piston part 500, the angle adjusting part 800 serves to induce the shaft part 600 to rotate on the angle adjusting part 800 in the first direction A together with the cylinder 330. That is, the angle adjusting part 800 functions as the rotation center axis of the shaft part 600 whose installation angle is varied when the cylinder 330 is deformed. Therefore, the angle adjusting part 800 may prevent a gap in the connection portion between the cylinder 330 and the spindle 420, which may occur when the shaft part 600 is disposed at a different angle from the cylinder 330 in case that the cylinder 330 is deformed. The angle adjusting part 800 is moved with the shaft part 600 and the pressing part 700 when the shaft part 600 and the pressing part 700 are moved. Thus, the angle adjusting part 800 may vary or adjust the position of the rotation center axis of the shaft part 600 in response to a change in stroke length of the piston part 500 by the wear of the pad plate part 200, thereby preventing the degradation in power transfer performance by a jam between the shaft part 600 and the pressing part 700.

Figure 3:
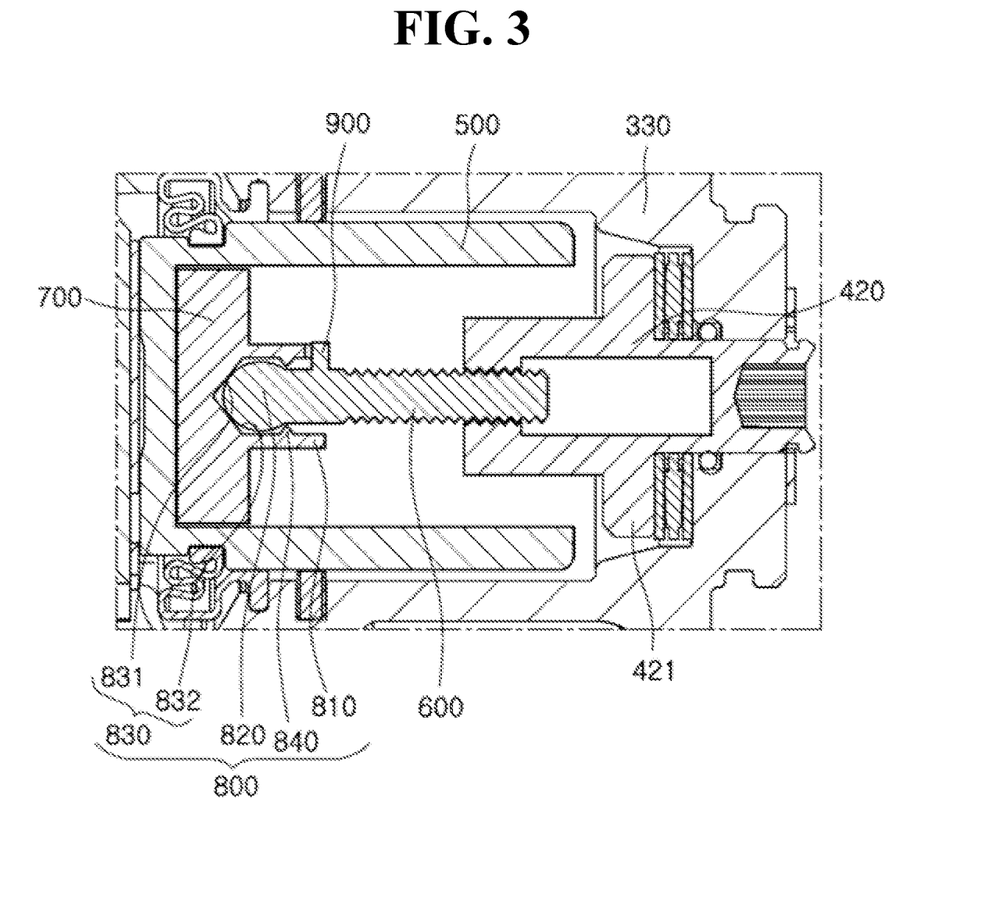
FIG. 3 is an expanded view schematically illustrating the configuration of an angle adjusting part in accordance with the embodiment of the present disclosure.

FIG. 3 is an expanded view schematically illustrating the configuration of the angle adjusting part in accordance with the embodiment of the present disclosure.

Referring to FIGS. 1 to 3, the angle adjusting part 800 in accordance with the embodiment of the present disclosure includes an insertion part 810, a ball joint part 820, a load switching part 830, and a separation prevention part 840.

The insertion part 810 is extended from the pressing part 700, and serves to rotatably support the ball joint part 820 which will be described below. The insertion part 810 in accordance with the embodiment of the present disclosure may be formed in a hollow cylindrical shape with an empty space. The insertion part 810 has one side connected to the rear surface of the pressing part 700 and the other side extended from the rear surface of the pressing part 700 in the longitudinal direction of the cylinder 330. The other side of the insertion part 810 is open so that the ball joint part 820 can be inserted into the insertion part 810. The diameter and the cross-sectional shape of the insertion part 810 may be variously changed in design depending on the shape of the ball joint part 820 or the like.

The insertion part 810 may have a cut-out portion 811 formed on the one side thereof. The cut-out portion 811 in accordance with the embodiment of the present disclosure may be formed in the shape of a hole extended through the inner and outer circumferential surfaces of the insertion part 810. The longitudinal direction of the cut-out portion 811 is set in parallel to the longitudinal direction of the insertion part 810. The cut-out portion 811 has one end (rear end in FIG. 4) which is open through an end of the insertion part 810. The stopper part 900 which will be described is inserted into the cut-out portion 811. The cut-out portion 811 has both inner surfaces abutting on the stopper part 900, and serves to restrict the axial rotation of the shaft part 600. The cut-out portion 811 guides the movement of the stopper part 900 in the longitudinal direction thereof when the angle of the shaft part 600 is changed, thereby allowing the rotation of the shaft part 600 in the first direction A.

The ball joint part 820 is extended from the shaft part 600, and inserted into the insertion part 810. The ball joint part 820 is rotated inside the insertion part 810 in connection with a change in angle of the shaft part 600. That is, the ball joint part 820 functions as the rotation center axis to rotatably support the shaft part 600 when the angle of the shaft part 600 is changed. The ball joint part 820 in accordance with the embodiment of the present disclosure is formed in substantially a spherical shape, and connected to the front end of the shaft part 600. The ball joint part 820 has a smaller diameter than the insertion part 810 so as to be smoothly inserted into the insertion part 810 and rotate inside the insertion part 810 without significant interference.

The load switching part 830 is disposed so as to face the front surface of the ball joint part 820, and concavely recessed into the pressing part 700 from the insertion part 810. The load switching part 830 comes into rolling contact with the front surface of the ball joint part 820 inserted into the insertion part 810. The load switching part 830 induces a pressing load, applied through the ball joint part 820, to be transferred in a direction parallel to the direction that the piston part 500 is moved forward or backward, when the angle of the shaft part 600 is changed. Thus, the load switching part 830 may transfer a sufficient pressing load to the piston part 500 even when the cylinder 330 is deformed.

Figure 4:
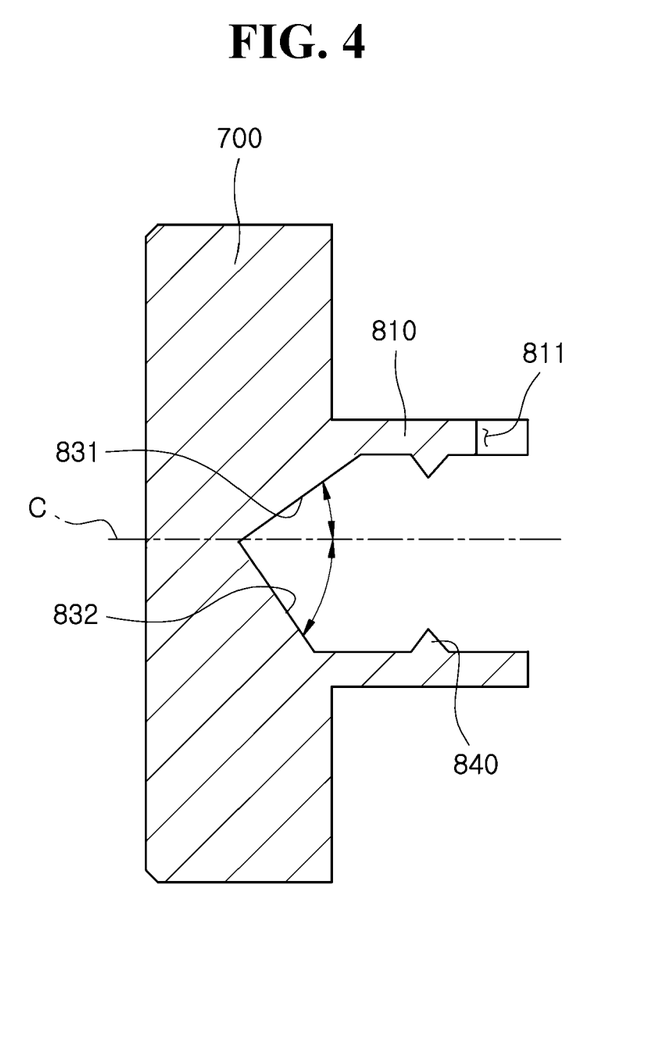
FIG. 4 is a cross-sectional view schematically illustrating the configuration of a load switching part in accordance with the embodiment of the present disclosure.

FIG. 4 is a cross-sectional view schematically illustrating the configuration of the load switching part in accordance with the embodiment of the present disclosure.

The load switching part 830 in accordance with the embodiment of the present disclosure includes a first inclined surface 831 and a second inclined surface 832.

The first inclined surface 831 and the second inclined surface 832 form the exteriors of one side and the other side of the load switching part 830, respectively. The first inclined surface 831 and the second inclined surface 832 in accordance with the embodiment of the present disclosure may be each formed in the shape of an inclined surface extended from the connection point between the pressing part 700 and the insertion part 810 toward the center axis C of the cylinder 330 disposed in the pressing part 700. The first and second inclined surfaces 831 and 832 are disposed so that the distance therebetween decreases toward the pressing part 700 from the insertion part 810. More specifically, the first and second inclined surfaces 831 and 832 are inclined upward and downward, respectively, on the basis of the center axis C of the cylinder 330. The first and second inclined surfaces 831 and 832 come into rolling contact with one side and the other side of the front surface of the ball joint part 820, respectively.

The angle between the first inclined surface 831 and the center axis of the cylinder 330 may be smaller than the angle between the second inclined surface 832 and the center axis of the cylinder 330. Therefore, when the shaft part 600 is rotated in the first direction A in response to the deformation of the cylinder 330, the second inclined surface 832 may induce a larger pressing load to be transferred in a direction parallel to the direction that the piston part 500 is moved forward or backward.

The separation prevention part 840 is extended from the insertion part 810, and disposed so as to face the rear surface of the ball joint part 820. The separation prevention part 840 in accordance with the embodiment of the present disclosure may be formed in the shape of a protrusion that protrudes from the inner surface of the insertion part 810 to the inside of the insertion part 810. The separation prevention part 840 may be provided as a plurality of separation prevention parts. The plurality of separation prevention parts 840 may be arranged at predetermined intervals in the circumferential direction of the insertion part 810. When the ball joint part 820 is moved in the direction that the ball joint part 820 is separated from the insertion part 810, i.e., to the right in FIG. 3, the separation prevention part 840 is brought into contact with the rear surface of the ball joint part 820, thereby restricting the movement of the ball joint part 820. Thus, the separation prevention part 840 may prevent the ball joint part 820 from being separated from the insertion part 810. When the shaft part 600 is moved backward to remove a braking force, the separation prevention part 840 may move the pressing part 700 to the rear with the shaft part 600. The separation prevention part 840 may be separately processed after the ball joint part 820 is inserted into the insertion part 810. Alternatively, the separation prevention part 840 may be processed in the insertion part 810 in advance, and then autonomously deformed so that the ball joint part 820 can be inserted into the insertion part 810.

The stopper part 900 is extended from the shaft part 600, and interferes with the insertion part 810 so as to constrain the axial rotation of the shaft part 600. Thus, the stopper part 900 may restrict the shaft part 600 from rotating on the center axis thereof, when the spindle 420 is rotated, thereby inducing a smooth linear motion of the shaft part 600.

Figure 5:
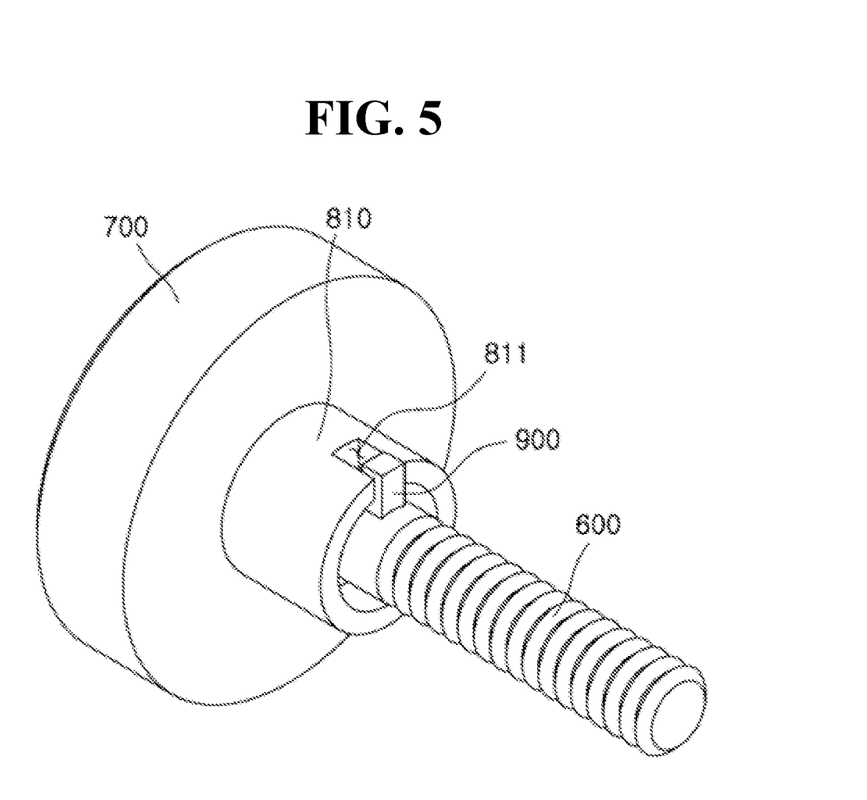
FIG. 5 is a perspective view schematically illustrating the configuration of a stopper in accordance with the embodiment of the present disclosure.

FIG. 5 is a perspective view schematically illustrating the configuration of the stopper part in accordance with the embodiment of the present disclosure.

Referring to FIGS. 2 and 5, the stopper part 900 in accordance with the embodiment of the present disclosure may be formed in the shape of a protrusion that protrudes in the radial direction of the shaft part 600 from the outer circumferential surface of the shaft part 600. The stopper part 900 is inserted into the cut-out portion 811 formed in the insertion part 810. The stopper part 900 has both surfaces abutting on the inner surface of the cut-out portion 811, and constrains the axial rotation of the shaft part 600. When the shaft part 600 is rotated on the ball joint part 820, the stopper part 900 is moved in the longitudinal direction of the cut-out portion 811, thereby allowing a change in angle of the shaft part 600.

Hereafter, an operation of the brake apparatus for a vehicle in accordance with the embodiment of the present disclosure will be described in detail.

Figure 6:
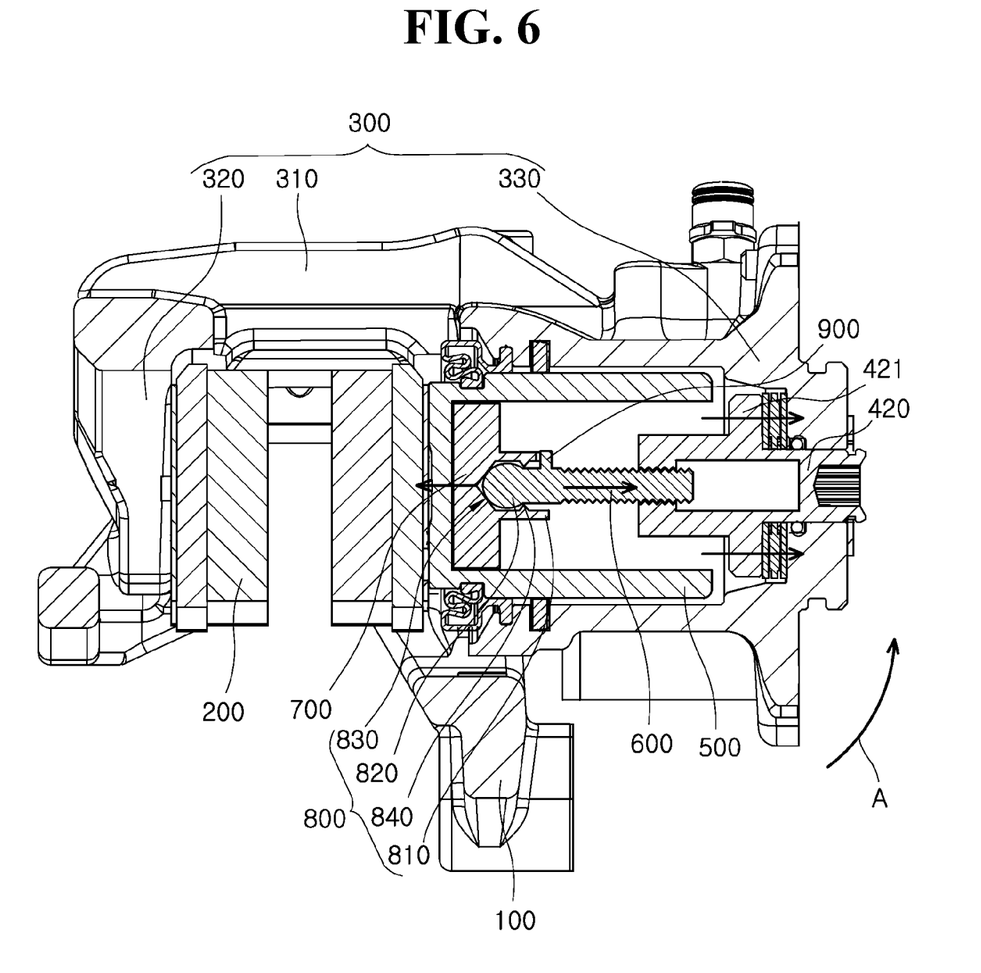
FIGS. 6 to 8 are operation diagrams schematically illustrating an operation process of the brake apparatus for a vehicle in accordance with the embodiment of the present disclosure.
Figure 7:
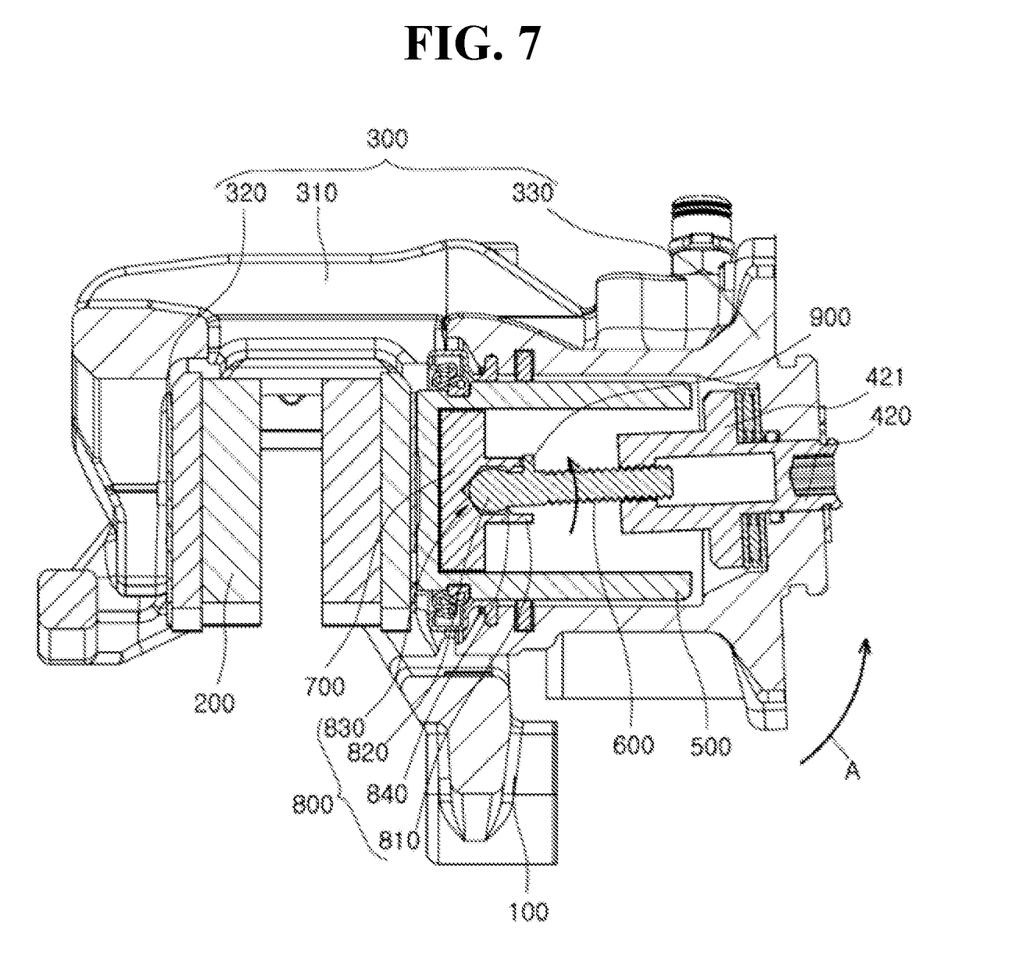
Figure 8:
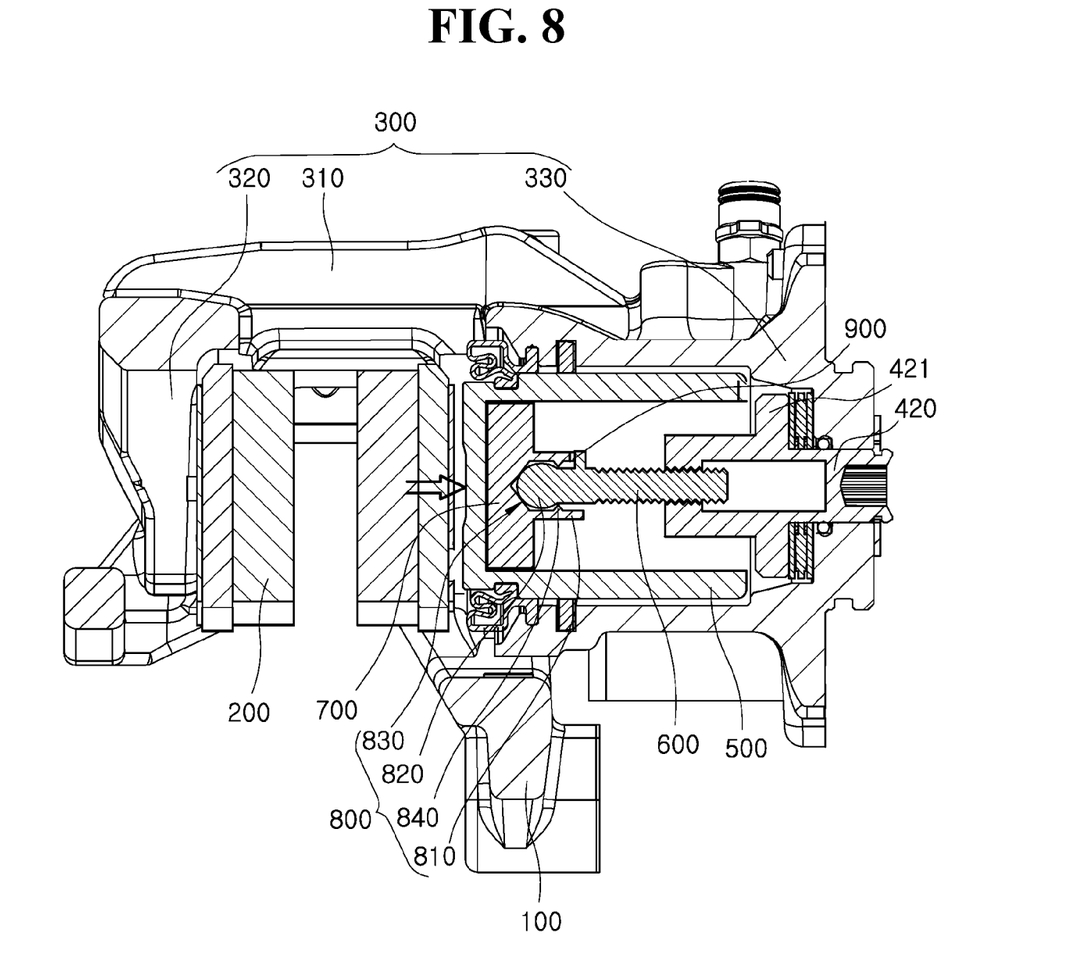

FIGS. 6 to 8 are operation diagrams schematically illustrating an operation process of the brake apparatus for a vehicle in accordance with the embodiment of the present disclosure.

Referring to FIGS. 1 to 8, when a braking force is to be applied to the vehicle, the spindle 420 is axially rotated to one side by a rotational force received from the power generator 410.

The shaft part 600 screwed to the inner circumferential surface of the spindle 420 is linearly moved to the front in connection with the axial rotation of the spindle 420.

As the shaft part 600 is moved forward, the pressing part 700 presses the piston part 500 forward.

Such a pressing force moves the piston part 500 to the front of the cylinder 330, and brings the pad plate part 200, disposed in the piston part 500, into contact with the disk 10.

As the piston part 500 presses the pad plate part 200 disposed therein, a reaction force acting in the opposite direction of the pressing force is generated in the piston part 500.

The caliper part 300 is slid backward by the reaction force, and the finger 320 brings the pad plate part 200, disposed on the outside, into contact with the disk 10. Therefore, the pair of pad plate parts 200 generate a braking force by using frictional forces with both sides of the disk 10.

The reaction force applied to the piston part 500 is sequentially transferred to the piston part 500, the pressing part 700, the angle adjusting part 800, the shaft part 600, and the spindle 420.

The reaction force transferred to the spindle 420 presses the rear surface of the cylinder 330 in a vertical direction, and torque to rotate the cylinder 330 in the first direction A is generated in the cylinder 330.

The cylinder 330 is deformed while rotated in the first direction A by such torque.

As the cylinder 330 is rotated in the first direction A, the shaft part 600 and the spindle 420 are also rotated on the ball joint part 820 in the first direction A.

In this case, as the piston part 500 forming a predetermined gap with the inner surface of the cylinder 330 is maintained in a horizontal state, the installation angles of the pressing part 700 and the shaft part 600 are varied.

Therefore, a large load may be prevented from being applied between the pressing part 700 and the shaft part 600, which makes it possible to prevent the degradation in efficiency by a jam between the pressing part 700 and the shaft part 600.

The pressing load, transferred to the pressing part 700 through the ball joint part 820 while the shaft part 600 is tilted, is induced in a direction parallel to the direction that the piston part 500 is moved forward and backward, by the load switching part 830.

Then, when the braking force is to be removed, the spindle 420 is axially rotated to the other side by a rotational force received from the power generator 410, and the shaft part 600 is linearly moved backward.

The pressing part 700 connected to the shaft part 600 through the angle adjusting part 800 is moved backward with the shaft part 600.

As the pressing part 700 is coupled or fixed to the inner surface of the piston part 500, the piston part 500 is also moved backward, and thus separated from the pad plate part 200.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
    a caliper part coupled to a vehicle body and having a cylinder;
    a piston part configured to move within the cylinder to make or break a contact with a pad plate part;
    a shaft part configured to reciprocate in mutually opposed directions parallel to a longitudinal direction of the cylinder when provided with a driving force from a driving part;
    a pressing part connected to the shaft part and configured to press the piston part toward the pad plate part when the shaft part moves in one of the mutually opposed directions in which the shaft part reciprocates; and
    an angle adjusting part positioned between the shaft part and the pressing part and configured to adjust a rotational axis angle of the shaft part with respect to the pressing part.

2. The brake apparatus of claim 1, wherein:
    the cylinder is configured to rotate in a first direction when provided with a reaction force generated by the contact made between the piston part and the pad plate part, and
    the shaft part is configured to rotate on the angle adjusting part in the first direction along with the cylinder.

3. The brake apparatus of claim 2, wherein the pressing part is coupled to an inner surface of the piston part.

4. The brake apparatus of claim 2, wherein the pressing part has a front surface configured to contact an inner rear surface of the piston part.

5. The brake apparatus of claim 4, wherein the front surface of the pressing part is flat.

6. The brake apparatus of claim 2, wherein the angle adjusting part comprises:
    an insertion part extending from the pressing part and having an insertion space; and
    a ball joint part extending from the shaft part and configured to rotate within the insertion part in connection with a change to the rotational axis angle of the shaft part.

7. The brake apparatus of claim 6, wherein the angle adjusting part further comprises a load switching part concavely recessed into the pressing part from the insertion part and configured to make a rolling contact with a front surface of the ball joint part.

8. The brake apparatus of claim 7, wherein the load switching part comprises first and second inclined surfaces structured such that a distance between the first and second inclined surfaces decreases toward the pressing part from the insertion part.

9. The brake apparatus of claim 8, wherein an angle between the first inclined surface and a center axis of the cylinder is smaller than that between the second inclined surface and the center axis of the cylinder.

10. The brake apparatus of claim 6, wherein the angle adjusting part further comprises a separation prevention part extending from the insertion part and positioned to face a rear surface of the ball joint part.

11. The brake apparatus of claim 10, wherein the separation prevention part comprises a plurality of separation prevention parts arranged in a circumferential direction of the insertion part with a predetermined interval therebetween.

12. The brake apparatus of claim 6, further comprising a stopper part extending from the shaft part and configured to interfere with a movement of the insertion part to constrain an axial rotation of the shaft part.

13. The brake apparatus of claim 12, wherein:
    the insertion part has a cut-out portion, and
    the stopper part protrudes in a radial direction of the shaft part from an outer circumferential surface of the shaft part to the cut-out portion of the insertion part.

14. The brake apparatus of claim 13, wherein the stopper part is in contact with an inner surface of the insertion part surrounding the cut-out portion.

15. The brake apparatus of claim 14, wherein the stopper part is configured to move in a longitudinal direction of the cut-out portion when the shaft part rotates in the first direction.

* * * * *